US009915748B2

United States Patent
Prance et al.

(10) Patent No.: US 9,915,748 B2
(45) Date of Patent: Mar. 13, 2018

(54) TARGET POSITION, MOVEMENT AND TRACKING SYSTEM

(71) Applicant: University of Sussex, Brighton (GB)

(72) Inventors: Robert J. Prance, Brighton (GB); Helen Prance, Brighton (GB); Sam Thomas Beardsmore-Rust, Brighton (GB); Philip Watson, West Stoke (GB)

(73) Assignee: University of Sussex, Brighton (GB)

( * ) Notice: Subject to any disclaimer, the term of this patent is extended or adjusted under 35 U.S.C. 154(b) by 540 days.

(21) Appl. No.: 14/355,567

(22) PCT Filed: Oct. 30, 2012

(86) PCT No.: PCT/GB2012/052694
§ 371 (c)(1),
(2) Date: Apr. 30, 2014

(87) PCT Pub. No.: WO2013/064813
PCT Pub. Date: May 10, 2013

(65) Prior Publication Data
US 2014/0292306 A1 Oct. 2, 2014

(30) Foreign Application Priority Data
Nov. 2, 2011 (GB) .................................. 1118970.1

(51) Int. Cl.
*G01R 1/30* (2006.01)
*G01V 3/08* (2006.01)
*G08B 13/24* (2006.01)

(52) U.S. Cl.
CPC .......... *G01V 3/088* (2013.01); *G08B 13/2491* (2013.01)

(58) Field of Classification Search
CPC ................................................... G01V 3/088
(Continued)

(56) References Cited

U.S. PATENT DOCUMENTS 3,812,484 A * 5/1974 Miller ................ G08B 13/2497
340/551
4,174,518 A * 11/1979 Mongeon ........... G08B 13/2497
323/280

(Continued)

FOREIGN PATENT DOCUMENTS

| EP | 2230523 A1 | 9/2010 |
| WO | 2009010735 | 1/2009 |
| WO | 2003048789 | 11/2013 |

OTHER PUBLICATIONS

Negative Feedback effects on amplfiers, http://www.bel.utcluj.ro/rom/dce/goltean/fec/06_nf_effects.pdf, Aug. 2008.*

(Continued)

*Primary Examiner* — Patrick Assouad
*Assistant Examiner* — Demetrius Pretlow
(74) *Attorney, Agent, or Firm* — Schwabe, Williamson & Wyatt, P.C.

(57) ABSTRACT

The invention provides a target object detection system, comprising a plurality of sensing nodes (10) for positioning at respective detection locations with respect to a detection area (12) that is situated within a field generated by an ambient AC source of excitation. Each sensing node has at least one electric potential sensor (22, 42) designed to detect perturbations in said field caused by a target object (14), said one sensor including an electrode (20, 40) responsive to the AC excitation field for generating detection signals, an amplifier (28) connected to the electrode for receiving and amplifying the detection signals to produce AC measurement signals as output, and at least one feedback circuit (30, 36) from an output of the amplifier to an input thereof for enhancing the input impedance of the amplifier. A signal processing arrangement (24, 26, 44) is associated with each sensing node and comprising a filter circuit (24) adapted to filter out frequencies generated by the ambient AC source of (Continued)

excitation that are outside a pre-defined bandwidth, and a level detector (26) responsive to the AC measurement signals for monitoring signal amplitude and generating amplitude information for use in producing target object data.

17 Claims, 12 Drawing Sheets

(58) Field of Classification Search
USPC .................................................... 324/123 R
See application file for complete search history.

(56) References Cited

U.S. PATENT DOCUMENTS

| | | | |
|---|---|---|---|
| 4,206,451 A * | 6/1980 | Kurschner | G08B 13/2497 |
| | | | 340/522 |
| 4,254,413 A * | 3/1981 | Mongeon | G08B 13/26 |
| | | | 340/561 |
| 4,504,822 A | 3/1985 | Goizman | |
| 6,032,110 A * | 2/2000 | Ishihara | G01B 7/31 |
| | | | 324/207.11 |
| 6,633,254 B1 * | 10/2003 | Sutphin | G01S 7/006 |
| | | | 340/541 |
| 7,885,700 B2 | 2/2011 | Clark et al. | |
| 7,920,975 B2 | 4/2011 | Hull | |
| 7,924,004 B2 | 4/2011 | Prance et al. | |
| 8,050,461 B2 | 11/2011 | Shpunt et al. | |
| 8,264,247 B2 | 9/2012 | Prance et al. | |
| 2005/0122118 A1 * | 6/2005 | Zank | G01D 9/005 |
| | | | 324/457 |
| 2005/0285591 A1 * | 12/2005 | Higgins | G01B 7/004 |
| | | | 324/207.17 |
| 2006/2061818 | 11/2006 | Zank et al. | |
| 2008/0255779 A1 | 10/2008 | Hull et al. | |
| 2010/0289479 A1 | 11/2010 | Prance et al. | |
| 2011/0245702 A1 | 10/2011 | Clark et al. | |
| 2012/0323512 A1 | 12/2012 | Rhodin et al. | |

OTHER PUBLICATIONS

Google search print out showing publication date of Negative Feedback Effect on Amplifiers. May 5, 2017.*
International Search Report and Written Opinion in related matter PCT/GB2012/052694, dated Sep. 20, 2013.
GB International Search Report in related matter GB1118970.1 dated Dec. 8, 2011.
Beardsmore et al., "Passive tracking of targets using electric field sensors", Sensors, and Command, Control, Communications, and Intelligence (C3I) Technologies for Homeland Security and Homeland Defense, vol. 7666, 2010, XP002712814, Proceedings of the Spie—The International Society for Optical Engineering SPIE, issn: 0277-786X, DOI: 10.1117/12.849642.
Beardsmore et al., "Detecting electric field disturbances for passive through wall movement and proximity sensing" Progress in Biomedical Optics and Imaging—Proceedings of SPIE—Smart Biomedical and Physiological Sensor Technology VI 2008 SPIE USE, vol. 7313, May 2009, XP002712815, DOI: 10.1117/12.817919.

* cited by examiner

TARGET POSITION, MOVEMENT AND TRACKING SYSTEM

CROSS REFERENCE TO RELATED APPLICATIONS

The present application is a national phase entry under 35 U.S.C. § 371 of International Application No. PCT/GB2012/052694, filed Oct. 30, 2012, entitled "TARGET POSITION, MOVEMENT AND TRACKING SYSTEM," which designated, among the various States, the United States of America, and which claims priority to Great Britain Patent Application No. 1118970.1, filed Nov. 2, 2011. Both applications are hereby incorporated herein by reference.

INTRODUCTION

This invention concerns a system for target position and movement detection and for target tracking, employing electric potential sensors.

BACKGROUND

It is known to use perturbations in the ambient static DC electric field between the surface of the Earth and the ionosphere, caused by a moving target object, which is either dielectric or conducting (resistive), in order to provide information about the movement of that object. No excitation field needs to be created locally, since the mere presence of the moving target object will perturb the ambient electric field and produce a local variation in this electric field at a detection site for the target object.

In these arrangements, a number of sensors, usually two per axis, have been employed to infer the location of a single moving object within a detection area defined by the positions of the sensors, as well as to monitor object velocity and movement for target tracking.

The prior art thus discloses the use of the ambient static (DC) electric field due to the Earth to detect movement of a target object, but such prior art has the significant drawback that the target object must be moving to be detected.

Furthermore, it has been found that the known techniques suffer from significant limitations when dealing with multiple targets, in terms of the complexity of signal acquisition and processing, and more importantly in terms of accurately discriminating between the different objects.

US2008/0255779 also discloses a method of detecting anomalies in an ambient AC field, using an AC sensor placed in such ambient AC field to generate a signal representative of the field, and processing the signal to monitor for anomalies.

THE INVENTION

We have discovered that it is possible to use ambient AC signals for target position and movement detection, in particular the pervasive domestic mains supply, usually at frequencies of either 50 Hz or 60 Hz, or any other continuous AC signal present in the surrounding environment, such as the background noise generated by computers, domestic appliances, electric motors or power supplies, to name but a few. Indeed, we have found that any other continuous AC signal giving rise to an extensive electric field, whether man-made or natural in origin, including background noise in a defined bandwidth, may also be used for target position and movement detection.

In particular, we have discovered that variations in the amplitude of any continuous ambient AC signal will occur in the presence of target objects, both moving and stationary. It would be usual generally to regard these signals as noise or interference rather than as signals capable of generating useful information. The known art is, insofar as we are aware, based on the assumption that specific AC signals must be actively generated from a purpose designed AC source for target object position or movement detection, or that ambient AC signals may be monitored for anomalies to permit the presence of an object to be detected but not its position or movement. Hitherto, no one has proposed detecting the position and/or movement of target objects in an ambient AC field.

The present invention envisages employing a sensor whose sensitivity is attuned to AC perturbations. Unlike the static DC excitation field case in which the target must be moving in order to generate a signal, when an AC excitation field having a frequency within the pass band of the target sensor is employed, then even stationary targets may be located. If the AC signal amplitude before the object is introduced into the detection area is known, changes occurring when the object is present can be observed. The AC signal amplitude will then remain at the changed level until either the object is taken away or it moves. This is simply due to the fact that the sensor detects information contained in the amplitude of an AC signal whereas it does not detect a DC response in the steady state situation where the amplitude is constant but only when such DC response changes.

The present invention seeks to overcome the limitations of the prior art by providing a target position, movement and tracking system, in which an external AC source of excitation is employed with an array of sensors for target object position and movement detection and tracking.

The invention seeks to provide a target position, movement and tracking system, in which perturbations in the amplitude of an AC signal from an external source are detected for target object detection and tracking, whether the object is stationary or moving.

The invention in its preferred form is applicable to the detection and tracking of target objects in already existing extensive external fields, such as the field cast by the mains supply, which usually has either 50 Hz or 60 Hz frequency.

According to one aspect of the present invention, there is provided a target object detection system, comprising:

A plurality of sensing nodes positioned at respective detection locations with respect to a detection area that is situated within a field generated by an ambient AC source of excitation;

Each sensing node having at least one electric potential sensor designed to detect perturbations in said field caused by a target object, said one sensor including an electrode responsive to the AC excitation field for generating detection signals, an amplifier connected to the electrode for receiving and amplifying the detection signals to produce AC measurement signals as output, and at least one feedback circuit from an output of the amplifier to an input thereof for enhancing the input impedance of the amplifier; and A signal processing arrangement associated with each sensing node and comprising a filter circuit adapted to filter out frequencies generated by the ambient AC source of excitation that are outside a pre-defined bandwidth, and a level detector responsive to the AC measurement signals for monitoring signal amplitude and generating amplitude information for use in producing target object data.

Preferably, the target object detection system also comprises a central processing unit responsive to the amplitude information for generating target object data by calculating at least one of the position and the movement of the target object.

According to another aspect of the present invention, there is provided a method for target object detection, comprising:

Positioning a plurality of sensing nodes at respective detection locations with respect to a detection area that is situated within a field generated by an ambient AC source of excitation, each sensing node having at least one electric potential sensor designed to detect perturbations in said field caused by a target object, said one sensor including an electrode responsive to the AC excitation field for generating detection signals, said one sensor further including an amplifier connected to the electrode for receiving and amplifying the detection signals to produce AC measurement signals as output, and at least one feedback circuit from an output of the amplifier to an input thereof for enhancing the input impedance of the amplifier;

Processing the AC measurement signals by filtering out frequencies generated by the ambient AC source of excitation that are outside a pre-defined bandwidth, and by monitoring signal amplitude to generate amplitude information for use in producing target object data.

Preferably, the method involves generating target object data responsive to the amplitude information by calculating at least one of the position and the movement of the target object.

In the preferred embodiment described below, signal acquisition involves filtering out and specifically rejecting quasi-DC low frequency signals caused by movement in the earth's field. This is because these signals are liable to very large variations in amplitude due to the number of different mechanisms by which they may be generated, and large variations in amplitude can easily lead to saturation of the detecting sensors. In practice, this means that the frequency response of the sensors is tailored to reject low frequencies and to respond maximally to the AC excitation frequency of the external field.

Signal processing in the preferred embodiment involves filtering the sensor output to limit noise, and then detecting the amplitude of the AC signal. This may be achieved using either a hardware peak detector, or an rms to DC converter, or means for digitising the detection signal and then determining the amplitude via software.

An important feature of the invention, therefore, is the realisation that it is possible to use signals generated by a pre-existing extensive AC excitation field, since it would be usual to regard these as noise or interference rather than as signals capable of generating useful information, and that such signals may be employed for the detection of the position and/or movement of a target object.

In an extension of the invention, a general noise background in a defined bandwidth, may also be used as the signal source for target detection. This approach is not necessarily limited to coherent single frequency excitation signals, as in the case of the mains supply. The detection system may be identical, with the inclusion of filters set to accept the band of frequencies associated with the noise. A peak detector or rms to DC converter will detect the noise, in exactly the same way as detection of a coherent signal.

The invention preferably comprises a number of advantageous features and modes of operation, including:

The use of various pre-existent external sources of AC excitation field whether coherent, as in the case of the mains supply, or not, as in the case of noise in a system for target position and/or movement detection.

A technique for identifying the presence, and for locating the position of a stationary target object.

An embodiment employing a wireless sensor network.

Detection of the origin of perturbation of the electric field caused by dielectric objects.

Detection of the origin of perturbation of the electric field caused by conducting/resistive objects.

THE DRAWINGS

The invention will be described further, by way of example only, with reference to the accompanying drawings, in which.

Figure 1:
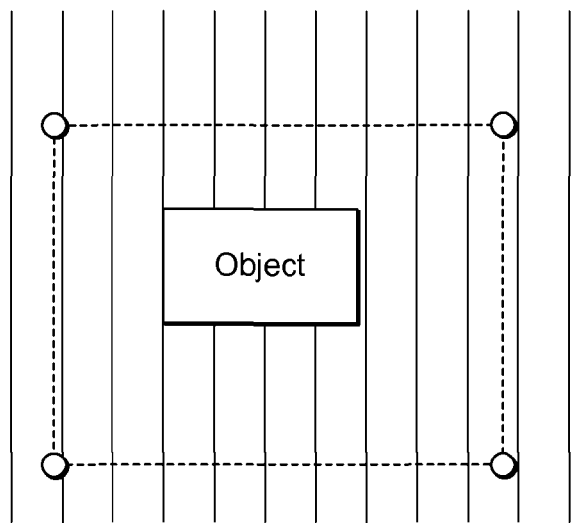
FIG. 1 shows an extensive AC excitation field in relation to a target object, the excitation field being considerably larger than the target object, with a detection area defined by the positions of four sensing nodes at the corners of a rectangle.

Referring now to the drawings, the principle of the invention will first be described.

Embodiment of Detection System

Figure 3:
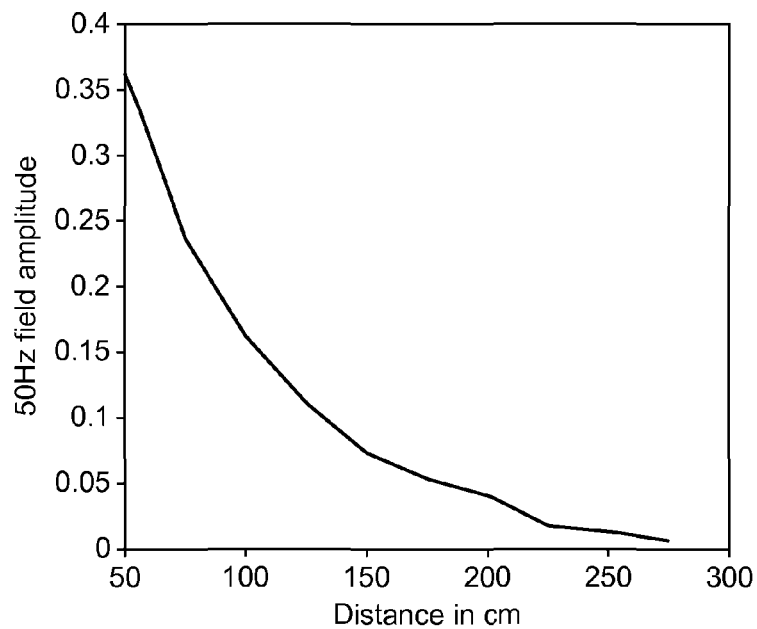
FIG. 3 is a graph representing the amplitude of the 50 Hz mains signal as a function of the distance between a sensor in the system of FIG. 2 and a person standing in front of the sensor.
Figure 4:
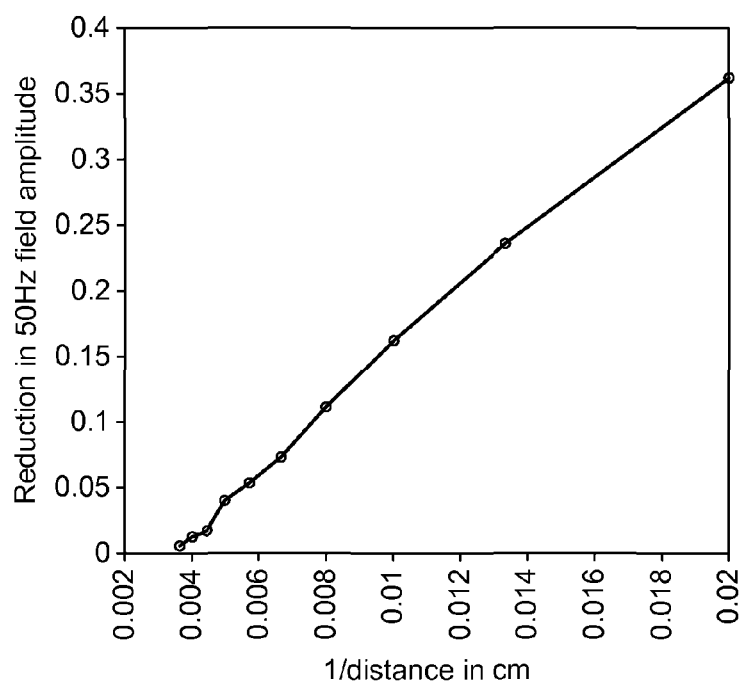
FIG. 4 is a graph corresponding to FIG. 3 but with the amplitude measured against the reciprocal of the distance.

If a single sensor is positioned at a height of 1 m from the floor and the amplitude of the 50 Hz or 60 Hz mains signal is measured as a function of the distance between the sensor and a person standing in front of the sensor, the plot shown in FIG. 3 is obtained. This clearly shows that the signal amplitude increases in a non-linear manner as the target approaches the sensor. If this data is now re-plotted as a function of the reciprocal of the distance, the plot shown in FIG. 4 is obtained, which is seen to be linear within the experimental error associated with the measurement and which confirms the expected 1/r dependence of the electric field amplitude with distance.

Figure 2:
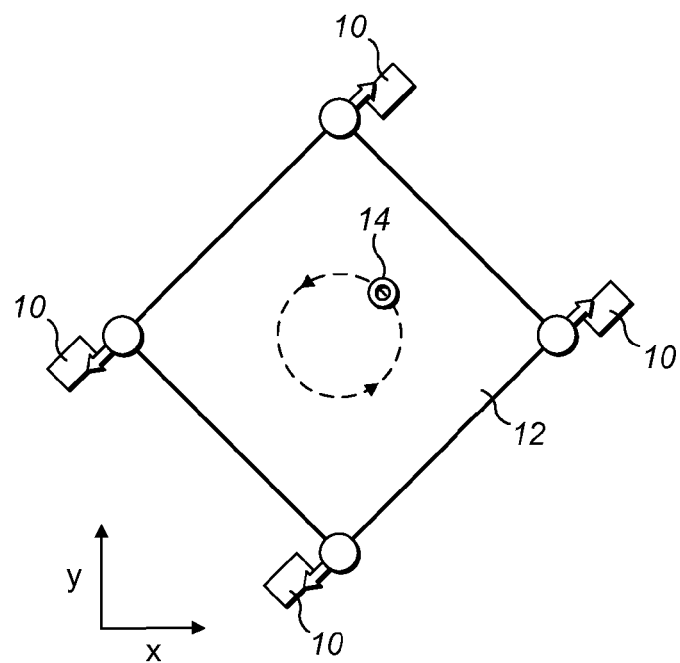
FIG. 2 is a diagrammatic view of a target object position and movement detection system according to the present invention, employing four sensing nodes.

To demonstrate the operation of a simple system according to the invention, such as may be used for locating a target in a room, four sensing nodes 10 are positioned at the corners of a 3.5 m×3.5 m square detection area 12, as shown in FIG. 2. The sensing nodes 10 are arranged as two opposed pairs with each such pair defining one axis, namely the X-axis or the Y-axis, as shown. A target object 14, for example a person, is caused to trace a locus, as indicated in dashed lines, within the detection area 12. The position of the object 14 is computed using a method as described below, in which signals from each pair of sensing nodes 10 are compared to produce a coordinate on the axis defined by that pair.

In this example, two pairs of opposing sensing nodes 10 are used to define a direction X or Y and to determine the relative position of the object with reference to that axis. If we position sensing nodes at the four corners of a detection space, then taking the relative outputs from any two of the sensing nodes will produce a solution for the x and y coordinates representing the position of the object. This is described below with reference to FIG. 13.

Figure 5:
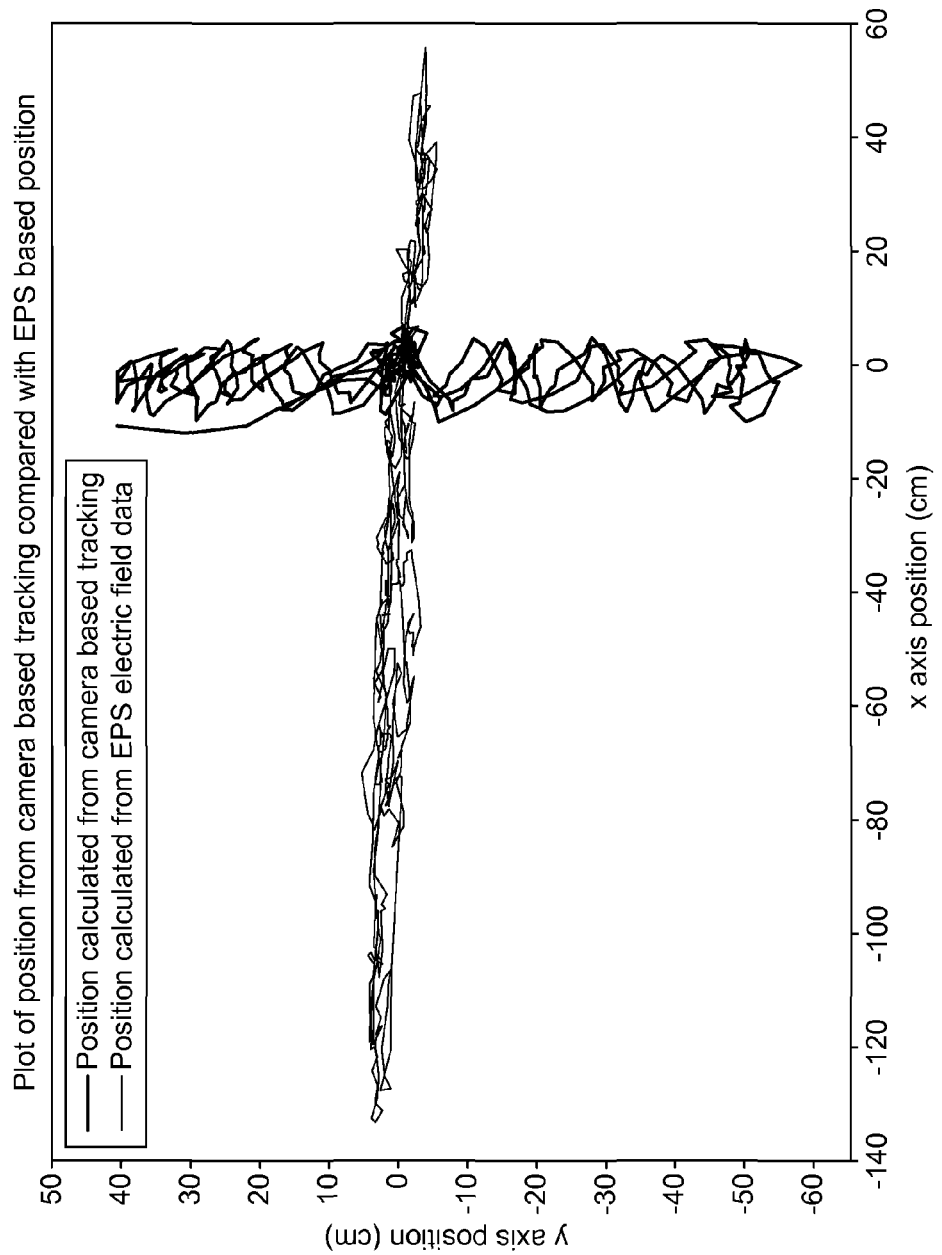
FIG. 5 is a diagram showing the position of a target object in a first trajectory, as measured by the detection system of FIG. 2 and as tracked by a video camera.

In this example, the pairs of opposing sensing nodes 10 were used to determine the relative position of the object with reference to the associated axes. For the purpose of comparison, a video camera (not shown) is also positioned vertically above the centre of the area, in order to correlate optical data with the positional information inferred from the sensing nodes 10. FIG. 5 shows the tracks resulting from the target moving along the X axis followed by moving along the Y axis, as recorded firstly by the sensing nodes 10 and secondly by the video camera. Clearly, there is a considerable degree of correlation between these two data sets.

Figure 6:
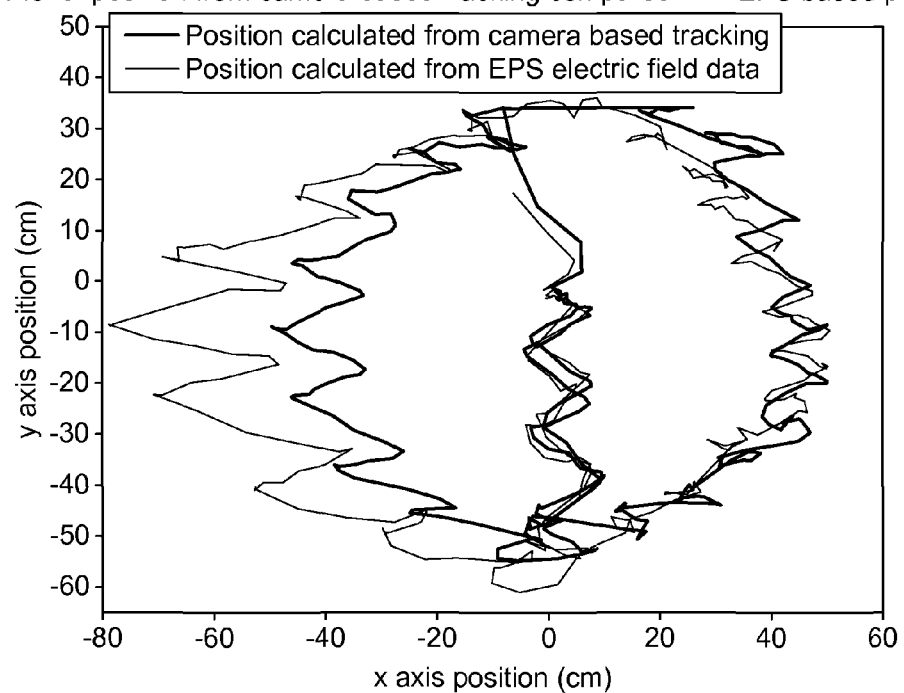
FIG. 6 is a diagram showing a different trajectory of the target object, again as measured by the detection system of FIG. 2 and as tracked by the video camera.

If, instead of moving along the two axes, X and Y, the target 14 is now moved in an approximately circular orbit with a diameter of 1 m around the centre of the area, the sensor and video data shown in FIG. 6 are obtained. Despite a slightly distorted orbit, there are a number of interesting conclusions to be drawn from this result. First, the two data sets are in good agreement; second, the zig-zag pattern observed in both the video and electric field data is real and corresponds with the subject taking individual steps around the circle. This allows for the possibility of this technique being used for gait recognition, gesture recognition and biometric purposes.

Figure 7:
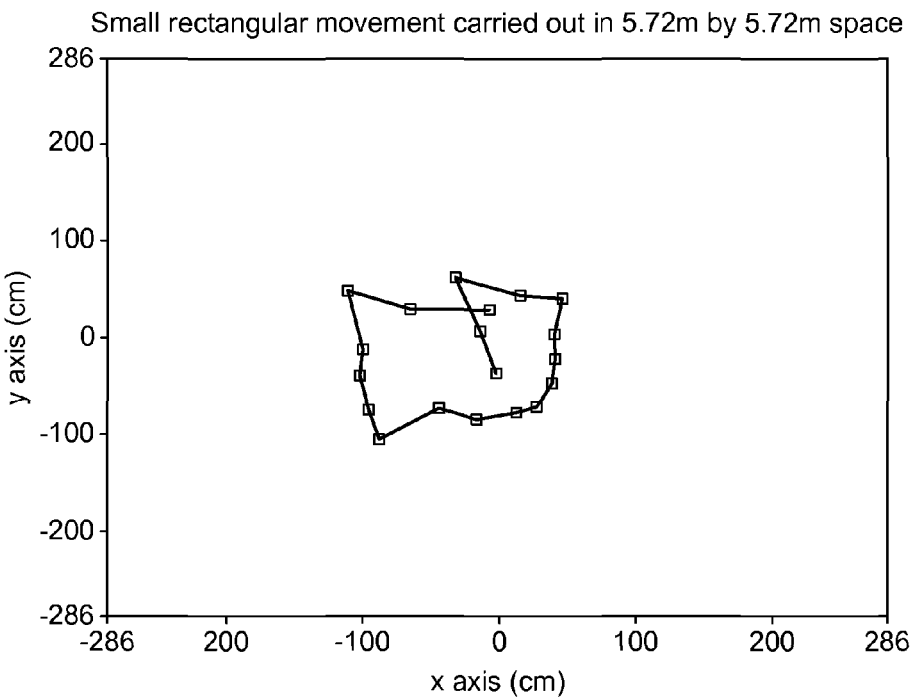
FIG. 7 is a diagram showing a number of stationary positions at which the target object came to a halt, as measured by the detection system of FIG. 2.

In an experiment to demonstrate the ability of this AC technique to locate the position of a stationary target, sensing nodes 10 were positioned on the perimeter of a 5.7 m×5.7 m square detection area. A human subject started from the centre position within the area, and then moved to a series of positions around a generally rectangular locus within the area, stopping and remaining stationary for a period at each position. A series of measurements were taken as the subject traced the edges of the rectangle, but only at the times when the subject was stationary. The result is shown in FIG. 7. Again, as in FIG. 6, some distortion of the path is evident, but it is clear that the target has been tracked from a data set acquired only when the target was stationary.

A first embodiment of the detection system illustrated in FIG. 2 will now be described further with reference to FIGS. 8 to 12, which illustrate respectively two different electric potential sensors for use respectively as the sensing nodes 10 in the sensing system, and a block diagram of the overall detection system including the circuit elements for signal acquisition, signal processing and display. A first electric potential sensor arrangement will be described initially with reference to FIGS. 8 and 9, and thereafter a second electric potential sensor arrangement will be described with reference to FIGS. 10 and 11.

Figure 8:
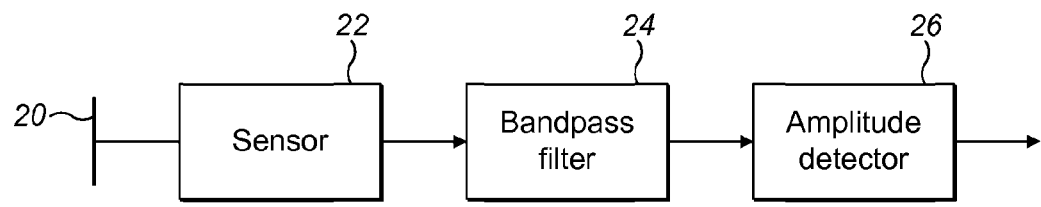
FIG. 8 is a block diagram of a first sensing node employed in a first embodiment of detection system according to the present invention.

FIG. 8 is a block diagram of a sensing node 10 including an electric potential sensor as disclosed in our published patent application no. WO03/048789, the disclosure of which is incorporated herein by reference. As shown, a disc electrode 20 is coupled to an electric potential sensor 22, which is followed by a signal processing arrangement comprising a bandpass filter 24 to maximise the response at the signal frequency of the excitation field, and a level detector 26 to provide signal amplitude information.

Figure 9:
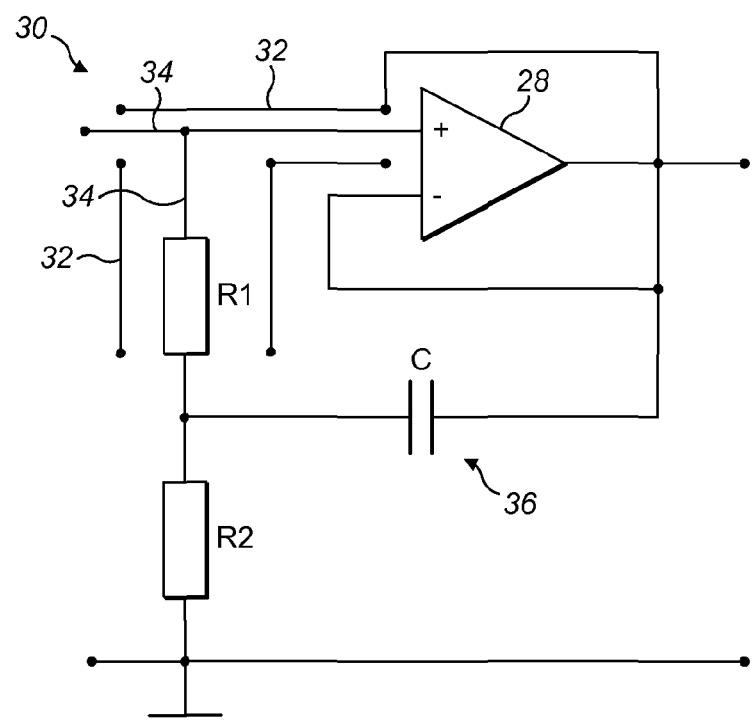
FIG. 9 is a circuit diagram of a sensor of the sensing node of FIG. 8.

The sensor 22 is shown in FIG. 9, and comprises an operational amplifier 28 including ancillary feedback circuits providing positive feedback for increasing the input impedance of the sensor and enhancing the sensitivity of the sensor to small electric potentials at low frequency. In this instance, as shown, the feedback circuits include a guard circuit 30 comprising a shield 32 driven from the output of the amplifier 28 and surrounding the input electrode, wiring and circuitry 34 for removing stray capacitance by maintaining the same electric potential on the shield and on the input electrode. The feedback circuits also include a bootstrapping circuit 36 connected between the output of the amplifier 28 and the positive input. The bootstrapping circuit 36 comprises an input bias resistor split into two components R1 and R2, and a capacitor C for applying the output voltage of the amplifier 28 to the mid point of the two resistors. The input voltage thus appears at both terminals of the upper resistor R1, resulting effectively in zero current flow and infinite impedance.

Figure 10:
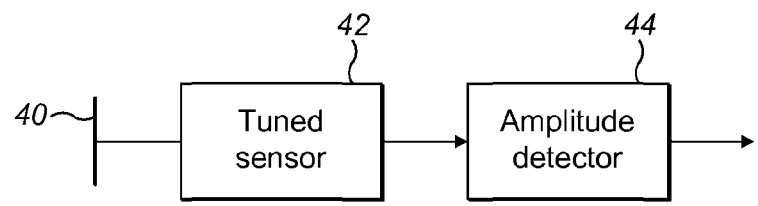
FIG. 10 is a block diagram of a second sensing node employed in the first embodiment of detection system according to the present invention.

Turning to FIG. 10, this is a block diagram showing a sensing node 10 including a tuned electric potential sensor as disclosed in our published patent application no. WO2009/010735, the disclosure of which is incorporated herein by reference. As shown, a disc electrode 40 is coupled to a tuned electric potential sensor 42, which is followed by a signal processing arrangement comprising a level detector 44 to provide signal amplitude information. The sensor 42 is further shown in FIG. 11, including feedback circuitry for increasing the input impedance of the sensor and enhancing the sensitivity of the sensor to small electric potentials.

Figure 11:
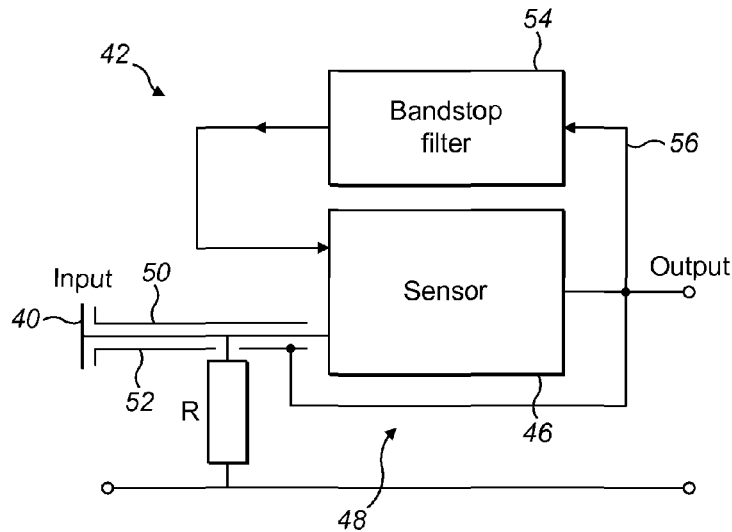
FIG. 11 is a block diagram of a sensor of the sensing node of FIG. 10.

The sensor 42 shown in FIG. 11 comprises an operational amplifier 46 having a positive feedback arrangement in the form of a guard circuit 48 comprising a shield 50 driven from the output of the amplifier 46 and surrounding the input electrode 40, and input wiring and circuitry 52. The sensor 42 further has a negative feedback loop 56 including a tunable filter 54 tailored to the frequency response of the detection system. In this instance, the filter 54 is a narrow band-stop filter, which imparts a band-pass characteristic to the sensor.

Whether the electric potential sensor arrangement of FIGS. 8 and 9 or the electric potential sensor arrangement of FIGS. 10 and 11 is employed, in each case four identical sensing nodes 10 are positioned at the corners of a square or rectangular target detection area 12, as shown in FIG. 2, with the nodes being situated in pairs to define an X-axis and a Y-axis. The two sensors in each pair of nodes 10 are arranged to act as a differential pair, for providing measurements for the associated axis, by physically connecting the two sensing nodes 10 in each pair to an associated differential amplifier by means of respective physical electrical connections. An overall detection system includes the differential pairs of sensors, together with signal acquisition and processing means, and a display arrangement for showing the output data obtained following signal processing. A block diagram of such a system is shown FIG. 12.

Figure 12:
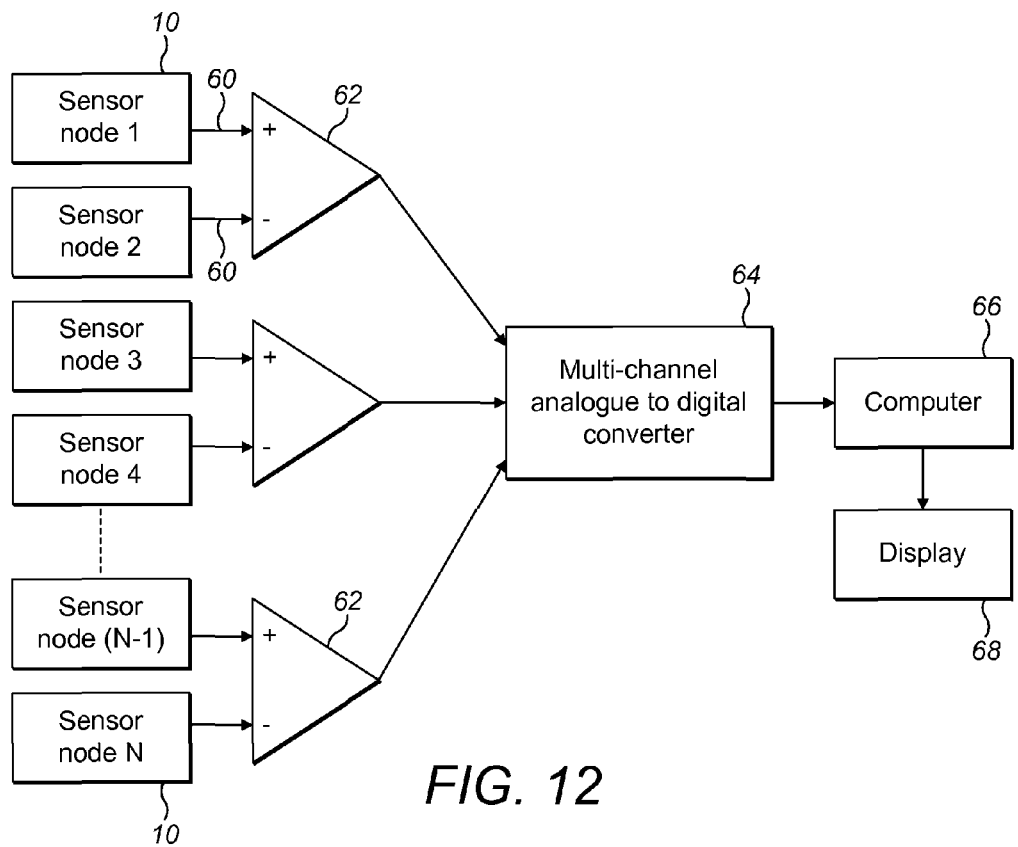
FIG. 12 is a block diagram of the first embodiment of detection system according to the present invention.

As shown in FIG. 12, the two pairs of sensing nodes 10 in each pair are connected by means of physical electrical connections 60 to an associated differential amplifier 62 for generating signal amplitude information, and are thence directly interfaced to a multi-channel analogue to digital converter 64 attached to a data acquisition and signal processing computer 66. The computer 66 contains a memory 66a storing a tracking algorithm for calculating the position and/or movement of the target object 14 and a central processing unit 66b for processing the amplitude information according to the algorithm to generate target object data. The computer 66 outputs the target object data to a display 68, which then displays the resulting position and movement data as a density map.

More particularly, the algorithm is based on a well defined property of the electric field, to determine the position and movement of a charged object, ie the target object, as follows. The electric field is known to fall-off in amplitude with the inverse of the distance from the source. The algorithm uses this fact and compares the relative amplitudes of the signals from the pairs of sensing nodes 10, to produce a relatively simple solution.

Figure 13:
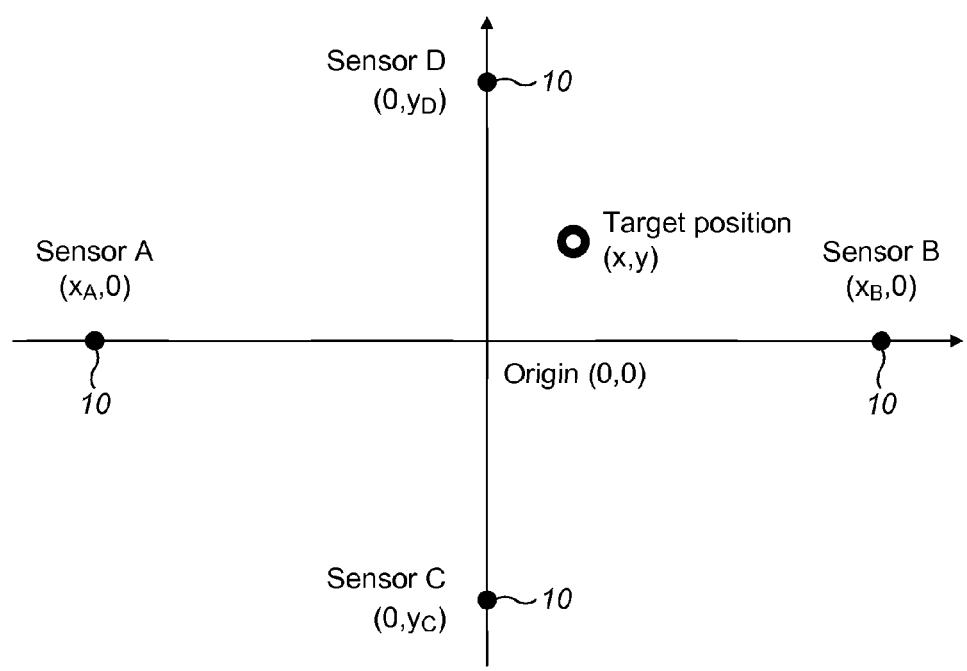
FIG. 13 is a schematic diagram of the first embodiment of detection system showing the relationship between the location of a target object and the four sensing nodes and illustrating a co-ordinate system employed in calculating the location of the target object.

According to the algorithm and employing the coordinate system shown in FIG. 13, the sensor positions are defined as symmetric about the origin (0,0). The sensors form two differential pairs A, B and C, D, respectively producing voltage outputs having amplitudes $V_B-V_A$ and $V_D-V_C$.

Each differential pair is used independently to determine the x and y position coordinates of the target. For example, for the x-axis, sensor pair A, B is used to calculate the target position x, as follows:

The amplitude of the AC signal (V) at a distance r from a point charge of magnitude q, in free space, may be expressed as:

$$V = \frac{q}{4\pi \epsilon_0 r}$$

Hence, the amplitudes of the AC signals at each of the sensors A, B are given by the equations:

$$V_A \propto \frac{1}{x - x_A}$$

$$V_B \propto \frac{1}{x_B - x}$$

where x is the x-axis coordinate of the target, and $x_A$, $x_B$ denote the respective sensor coordinates.

Two simultaneous equations for the target position are then used to relate the sensor potentials to the target position:

$$x \propto \frac{1}{V_A} + x_A, V_A \neq 0$$

$$x \propto x_B - \frac{1}{V_B}, V_B \neq 0$$

The symmetric geometry for the sensor positions sets $x_B = -x_A$, so that the above equations can be solved to give:

$$x \propto \frac{V_B - V_A}{2V_A V_B}, V_A V_B \neq 0$$

For small deviations of the target about the origin, the product $2V_A V_B$ is approximately constant as a function of the target position, and so the solution can be simplified to give:

$$x \propto V_B - V_A$$

Thus, the differential output voltage is directly related to the target position.

Similarly, it can be shown that for the sensor pair C, D, the target position y coordinate can be given as:

$$y \propto V_D - V_C$$

Consequently, by using the two pairs of sensing nodes, A, B and C, D in FIG. 13, and setting up the algorithm to take the difference between the two sensors in each pair using the associated differential amplifier 62, the coordinates for the target object are obtained.

In the simplest implementation, a linearised model may therefore be employed in the computer 66 such that these difference signals are directly related to the target position. This linear approximation holds for situations where the target does not approach the sensors too closely, which means restricting the detection area, and hence the target movement area, to be half of the distance between the sensors and to be centred on the middle of the axis.

If a better fit, or a larger relative detection area, is required, it is necessary to depart from the linear approximation method. In this case, the algorithm must additionally apply a correction factor to the data, which varies in amplitude as a function of position. Thus, the correction factor is employed in addition to the simple scaling factor, and will take account of the true non-linear relationship which exists between the signal amplitude and the target object distance from the sensing node.

Wireless Node Embodiment

The system described above basically utilizes four sensing nodes 10, each including a single sensor, configured to act as two differential pairs. Each opposing pair of sensing nodes 10 defines an axis with a baseline equal to the distance between the sensors of the nodes, and requires a physical electrical connection between the sensing nodes 10 and the associated differential amplifier 62 to act as a voltage reference. This physical connection is an essential, if undesirable, feature in this arrangement. In effect, we are measuring the electric field between the pair of sensors in Volts/m, or put another way, we may consider the pair of sensors to be analogous to a voltmeter with two measurement probes.

Clearly, if these sensors are to be deployed around the perimeter of a large space, or if a distribution of a large network of sensors is needed, the requirement for a physical connection between them is a severe restriction. Even if we "dead reckon" the position of the target using the data from each of the sensors individually, every sensor will require a local earth or reference connection. While this may be possible, using a ground connection, for sensors deployed in an open environment, or for indoor applications where the sensors are plugged into a mains supply, this will not in general be convenient or desirable.

Ideally, it would be advantageous to deploy a number of self contained autonomous wireless sensing nodes to monitor the electric field perturbations in a given area. One potential solution to this problem is to measure the electric field locally using a very short baseline pair of sensors, contained within a single measurement node, and then to compare this with the output from another similar sensing node. Thus, each node containing a single sensor, as described above, would be replaced by a node containing a closely spaced pair of sensors. In this way, a measurement of the electric field gradient may be obtained. Perturbations would then be measured by observing changes in the local electric field gradient, rather than changes in the electric field.

Figure 14:
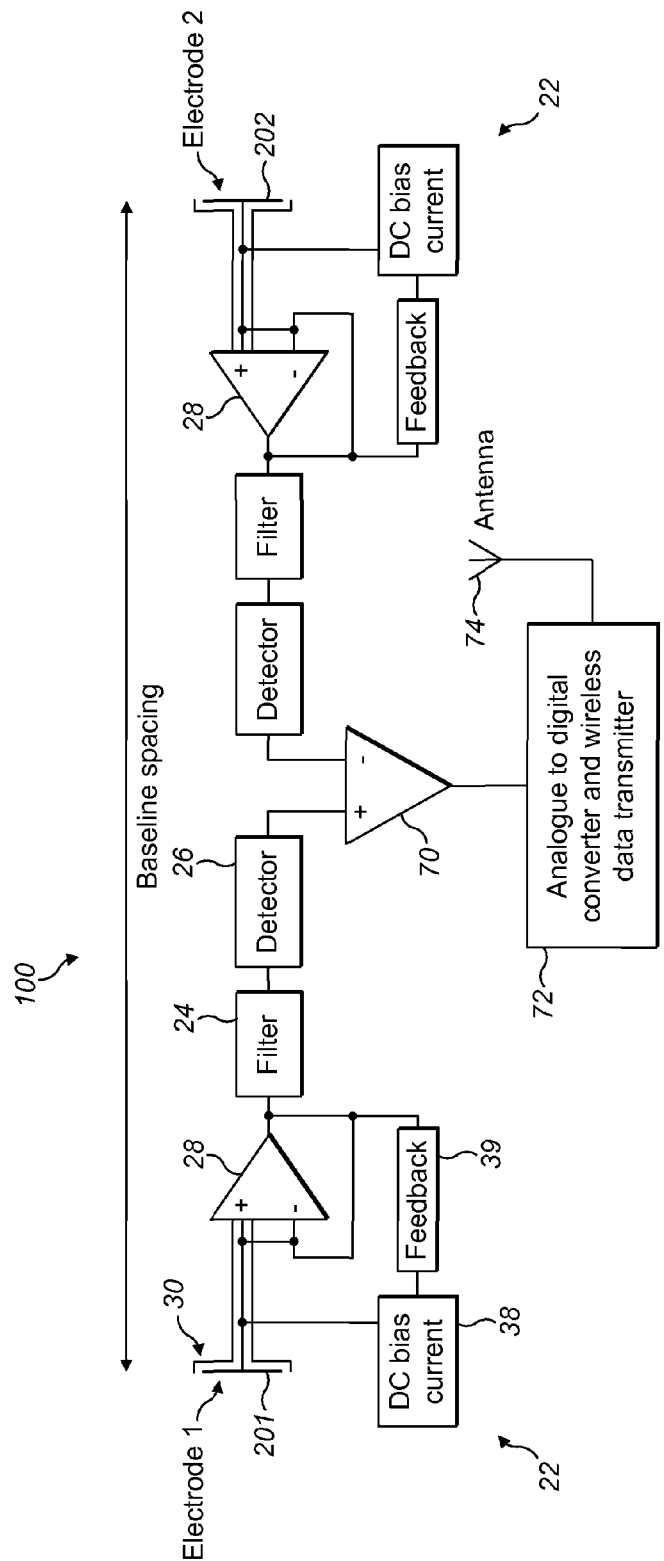
FIG. 14 is a circuit diagram of a first sensing node for use in a second embodiment of detection system according to the present invention.

An example of such an embodiment is shown in FIG. 14, where a node 100 comprises two EP sensors 22, eg as shown in FIG. 9, configured to measure the local electric field over a short baseline, whose length is of the order of 1-10 cm between the first electrode 201 and the second electrode 202. This is achieved without the necessity for a reference connection, and the node 100 may be self powered by placing a respective internal battery supply in each circuit element shown. As further illustrated, each sensor 22 comprises an amplifier 28, having feedback circuits in the form of a guard circuit 30, a DC bias current circuit 38 and an additional feedback circuit arrangement 39 that may eg include bootstrapping, neutralisation, supply modulation and a DC to low frequency feedback circuit.

The two sensors 22 are connected to a differential amplifier 70, and thence to an analogue to digital converter and wireless data transmitter 72, which converts the differential signal into digital format and supplies the signal to an antenna 74 for transmission. It is to be noted that bandpass filtration 24 and AC signal amplitude detection 26 is assumed to be contained within each sensor 22 as per FIG. 8.

By way of example, it may be assumed that the FIG. 14 embodiment has a baseline measurement of approximately 10 cm and employs disc electrodes each having a diameter of 2 cm. However, the same sensitivity can be achieved with a much more compact arrangement, as shown in FIG. 15.

Since electric field is defined and measured as Volts/m, it follows that if we use a very short baseline to perform a measurement of the local electric field then the amplitude of the signal will be proportionally smaller. One variation on the sensor node shown in FIG. 14, therefore, which may be used to alleviate this problem, is an unbalanced differential node as shown in FIG. 15.

Figure 15:
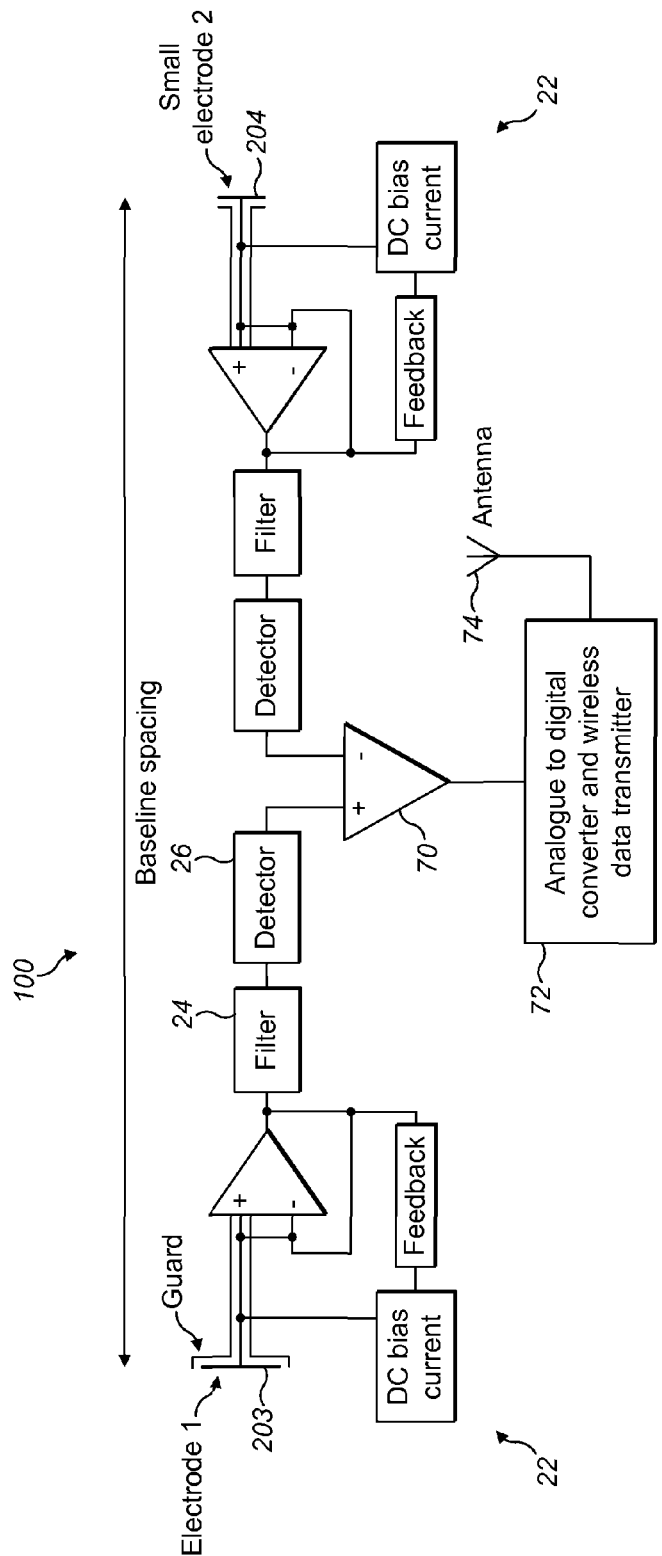
FIG. 15 is a circuit diagram of a second sensing node for use in the second embodiment of detection system according to the present invention.

The embodiment shown in FIG. 15 is identical with the embodiment shown in FIG. 14 with the exception that the baseline is much shorter and the sizes of the two electrodes 203, 204 are now significantly different. Comparable results with the FIG. 14 embodiment may be achieved here with a baseline measurement of 1 cm, and two electrode sizes respectively of 2 cm and $^2\sqrt{10}$ cm. Accordingly, in FIG. 15, the same parts are designated by the same reference numerals and will not be described further.

The sensitivity of electric potential sensors, when weakly capacitively coupled to an extensive electric field, is governed by the self capacitance of the electrode. Therefore, varying the electrode size will vary the relative sensitivity of the two sensors 22 within the node 100. The smaller electrode 204 will exhibit a lower sensitivity than the larger one 203 and will serve to unbalance the differential pair, hence increasing the sensitivity of the node 100 to small differences between the two sensors 22. In effect, the smaller electrode 204 is used to create a local reference potential which depends only weakly on the electric field perturbations, when compared with the larger electrode 203, and will act as a form of local artificial earth.

The use of high dynamic range sensors, as shown eg in FIG. 9, and as described in our earlier published patent application, is an advantage for most of the likely application areas for these techniques, since the signal amplitudes may vary widely depending on the distance between the object and the sensor.

It is to be noted that the wireless nodes 100 of FIGS. 14 and 15 could equally well employ the sensor 42 of FIG. 11, in place of that of FIG. 9, with the same advantages.

Figure 16:
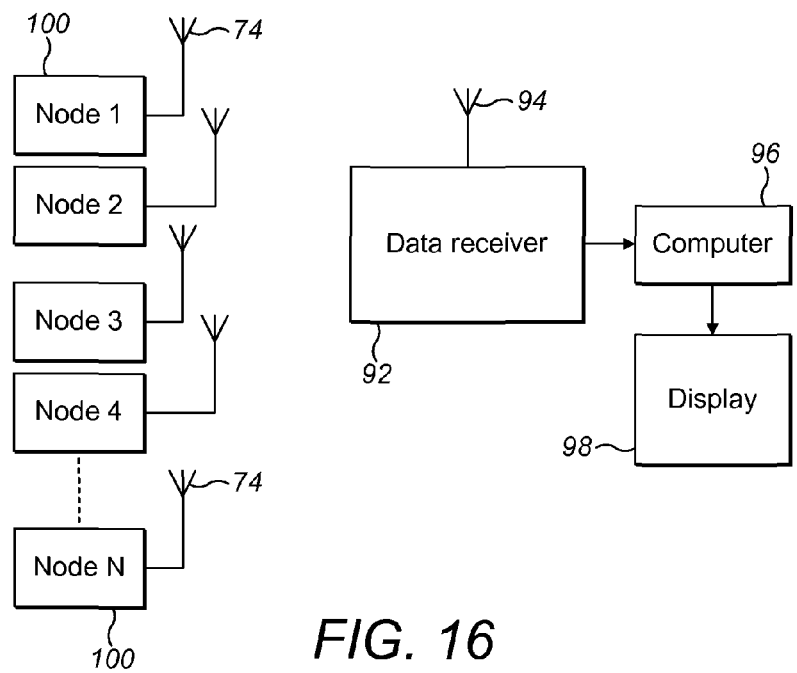
FIG. 16 is a block diagram of the second embodiment of detection system according to the present invention employing sensing nodes as shown in FIG. 14 or FIG. 15.

FIG. 16 is a block diagram showing a number of wireless nodes 100, which with a remote receiver 92 are configured to form a target position, movement and tracking system. The nodes 100, each comprising a pair of sensors 22 or 42, transmit data by way of the antennae 74 to the receiver 92, which picks up the wireless signals through an antenna 94. The receiver 92 then supplies the data to a data acquisition and signal processing computer 96. The computer 96 incorporates a memory 96a and central processing unit 96b and employs the algorithm described above to carry out the calculations indicated and display the resulting position and movement data as a density map on a display 98.

Implementations of Invention

In practical implementations of the invention, the detection area 12 may be located virtually anywhere that the AC mains supply or local noise prevail, including the home, an office, a laboratory or factory, a travel terminal, or an open ground or field.

The source of excitation may be ambient AC signals from the AC mains supply or a local generator, or the background noise generated, for example, by computers, domestic appliances, electric motors or power supplies. Whilst the invention has been shown and described with reference to the AC mains supply as source of excitation, the invention can also be employed with ambient noise as the source of excitation. In this instance, the circuitry needed is exactly the same, with the exception that the bandwidth/range of the filter circuits is altered to suit the bandwidth of the noise.

The target object may be any conducting or dielectric object, including for example, a person, or a vehicle. Conducting and/or resistive objects will cause electric field perturbations in a straightforward manner. The presence of a conductive or resistive object will provide a short circuit path which will equalize the spatial potential across the dimensions of the object. In the case of a person standing in an excitation field, this will have the effect of shorting the field to ground over the dimension of the subject effectively giving a potential at head level of ~0 V.

Sparse Array Embodiment

Figure 17:
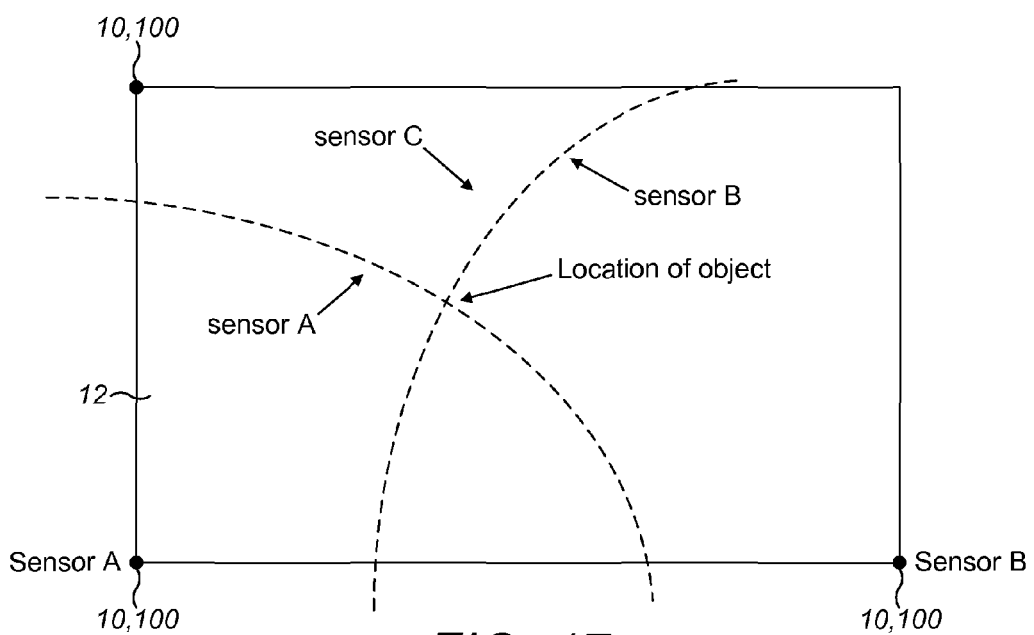
FIG. 17 is a schematic diagram of a further embodiment of detection system according to the present invention, employing three sensing nodes and showing the relationship between the location of a target object and the three nodes.

The previous embodiments are based on the use of differential pairs of sensors situated at the corners of a rectangular detection area, but an alternative arrangement is also possible, which does not employ differential pairs of sensors. Such arrangement is described with reference to FIGS. 17 and 18, and here assumes wired connections for the sensors. In this instance, the system of FIG. 12 will be employed with the exceptions that the differential amplifiers 62 are omitted and a different algorithm is stored in the memory of, and controls processing by, the computer 66, as described below.

By making use of a well defined property of the electric field, it is also possible to image the position and movement of a target object using fewer sensors than in the embodiments described above, although the data processing becomes more complicated in this instance. The electric field is known to fall-off in amplitude with the inverse of the distance from the source. Using this fact and comparing the relative amplitudes of the signals from a few sensors, the position of the object may be determined by means of the following algorithm in a manner analogous to triangulation. For example, if sensing nodes 10, 100 are positioned at three of the four corners of a detection area 12, then taking the relative outputs from any two of the sensors will produce a solution which is an arc. Where the two arcs intersect is the position of the object. This is shown pictorially in FIG. 17.

Figure 18:
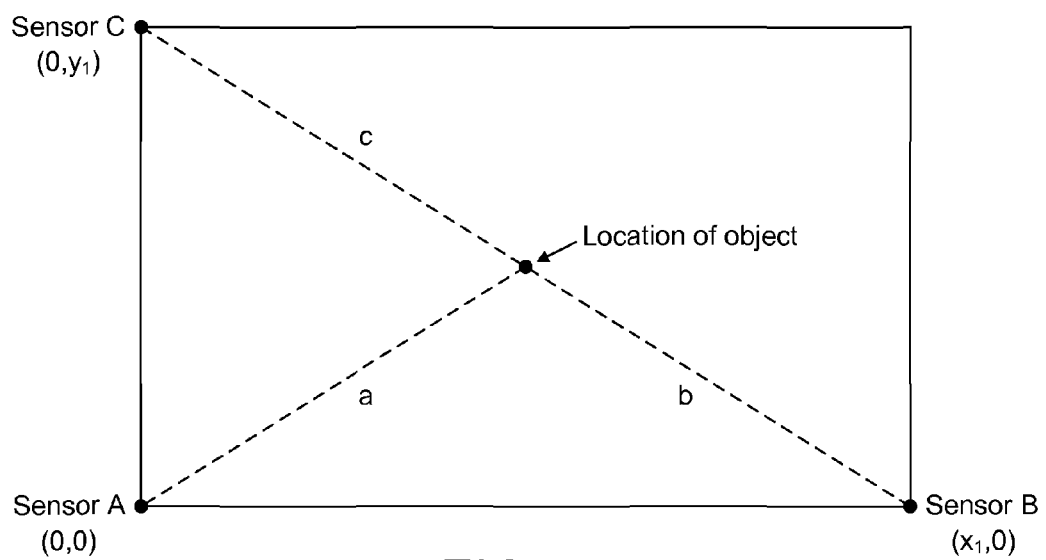
FIG. 18 is a schematic diagram illustrating a co-ordinate system employed in calculating the location of the target object in FIG. 17.

In order to set up the algorithm including the equations required to determine the position of the object, we must first define the positions of the sensors and the dielectric object, as in the first embodiment described above. The coordinate system used is shown in FIG. 18.

Mathematically the amplitude of the AC signal (V) at a distance r from a point charge of magnitude q, in free space, may be expressed as:

$$V = \frac{q}{4\pi\varepsilon_0 r}$$

Which means that the amplitudes at the sensors are given by:

$$V_a \propto \frac{1}{a}$$

$$V_b \propto \frac{1}{b}$$

$$V_c \propto \frac{1}{c}$$

Where: $a=\sqrt{x^2+y^2}$ $b=\sqrt{(x-x_1)^2+y^2}$ $c=\sqrt{x^2+(y-y_1)^2}$

At this point it is useful to define some ratios and variables:

Ratio $1=a/b=V_b/V_a$ and Ratio $2=a/c=V_c/V_a$
A=Ratio 1×Ratio 1  B=Ratio 2×Ratio 2
$C=2A\times x_1$ $F=A\times x_1^2$ $H=2B\times y_1$ $I=B\times y_1^2$ Two simultaneous equations are then used to relate these variables:

$$x^2+y^2=A[(x-x_1)^2+y^2]=Ax^2-2Ax_1x+Ax_1^2+Ay^2$$

Which may be written as:

$$(1-A)x^2+(1-A)y^2+Cx=F \quad\quad 3.1$$

And:

$$x^2+y^2=B[(y-y_1)^2+x^2]=Bx^2-2By_1y+By_1^2+By^2$$

Which may be written as:

$$(1-B)x^2+(1-B)y^2+Hy=I \quad\quad 3.2$$

Multiplying equation 3.1 by (1−B) and 3.2 by (1−A) gives:

$$(1-B)(3.1)=(1-B)(1-A)x^2+(1-B)(1-A)y^2+(1-B)Cx=(1-B)F \quad\quad 3.3$$

$$(1-A)(3.2)=(1-A)(1-B)x^2+(1-A)(1-B)y^2+(1-A)Hy=(1-A)I \quad\quad 3.4$$

Subtracting equation 3.4 from 3.2 gives:

$$C(1-B)x-H(1-A)y=F(1-B)-I(1-A)$$

Rearranging to give y in terms of x:

$$y = \frac{C(1-B)}{H(1-A)}x - \frac{F(1-B)-I(1-A)}{H(1-A)} \quad\quad 3.5$$

Substituting equation 3.5 into 3.1 gives:

$$(1-A)x^2+(1-A)\left[\frac{C(1-B)x}{H(1-A)}-\frac{F(1-B)-I(1-A)}{H(1-A)}\right]^2+Cx-F=0 \quad\quad 3.6$$

Expanding the bracket in equation 3.6 gives:

$$\left[\frac{C(1-B)x}{H(1-A)}-\frac{F(1-B)-I(1-A)}{H(1-A)}\right]^2 = \frac{C^2(1-B)^2x^2}{H^2(1-A)^2} - \frac{2C(1-B)[F(1-B)-I(1-A)]x}{H^2(1-A)^2} + \frac{[F(1-B)-I(1-A)]^2}{H^2(1-A)^2}$$

Substituting equation 3.7 into 3.6 gives:

$$\left[1-A+\frac{C^2(1-B)}{H^2(1-A)}\right]x^2+\left[C-\frac{2C(1-B)[F(1-B)-I(1-A)]}{H^2(1-A)}\right]x+\left[\frac{[F(1-B)-I(1-A)]^2}{H^2(1-A)}-F\right]=0$$

Which may be solved for x, taking x>0 and y>0, then substitute into equation 3.5 to find y.

Figure 19:
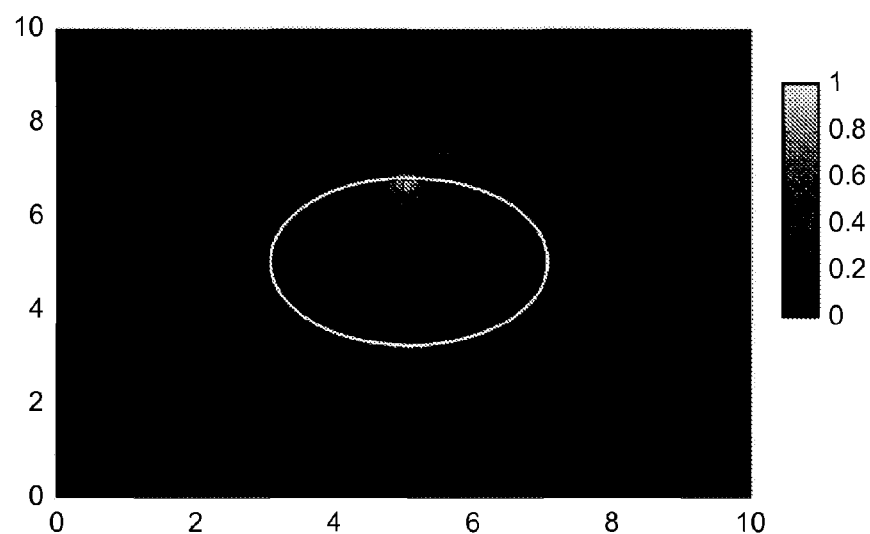
FIG. 19 is a plan diagram illustrating the locus of a target object as calculated by simulation for the detection system of FIGS. 17 and 18.

A single frame from a simulation of this procedure is shown in FIG. 19. The object in this case consists of a dielectric pendulum oscillating in an elliptical orbit in the plane of the sensors. This method may also be extended to operate in a three dimensional space simply with the addition of a third sparse array on a further perpendicular Z-axis.

A more complex situation may occur in the real world, where the presence of additional objects in the detection area or room may distort the electric field. It will therefore, in many cases, be necessary to modify the equations given above to allow for this additional complexity. This would involve modifying the dependence of the potential on distance as follows:

$$V = \frac{q}{4\pi\varepsilon_0 r^n}$$

The numerical value of n may be determined in practice by introducing a fourth sensor at the empty vertex. This produces redundant information which enables two sets of equations to be solved and optimised for a single point solution by varying n. The ratios are then replaced by the following expressions, equations set up and then solved as before.

$$V_a \propto \frac{1}{a^n}$$
$$V_b \propto \frac{1}{b^n}$$
$$V_c \propto \frac{1}{c^n}$$

Ratio 1=a/b=$(V_b/V_a)^{1/n}$ and Ratio 2=a/c=$(V_c/V_a)^{1/n}$

Centre of Charge Solution

While the methods described above provide unambiguous positional information, this is only true for a single moving dielectric object. For the case where multiple moving objects are involved then this method will produce a single "centre of charge" solution, analogous to a centre of mass in a mechanics situation.

Figure 20:
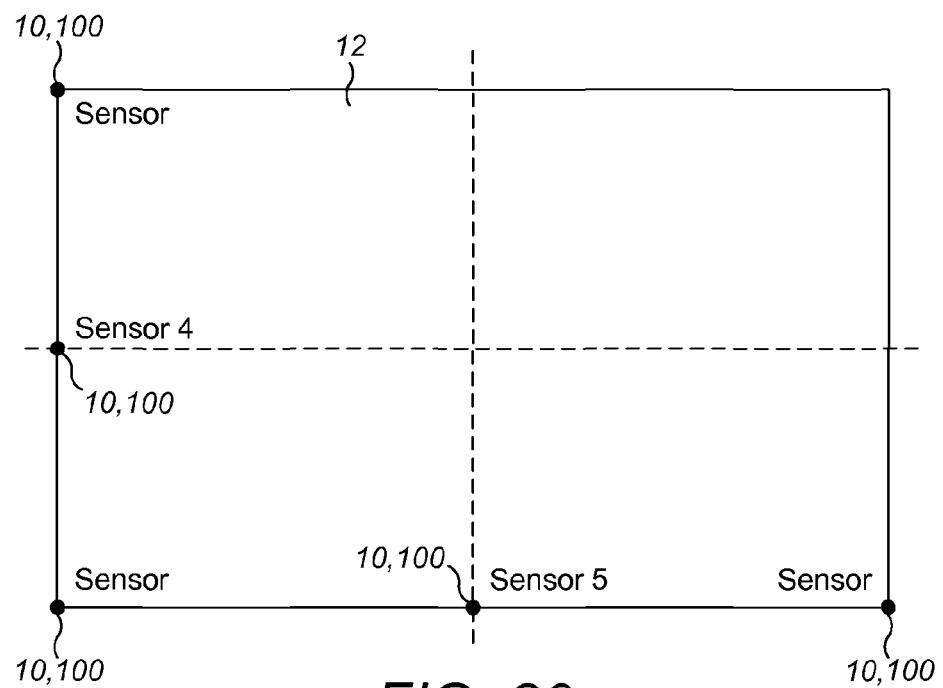
FIG. 20 is a schematic diagram of a further embodiment of detection system according to the present invention.

The method of resolving the ambiguity is to increase the number of sensing nodes 10, 100 in the sparse array. It is only necessary to add a few additional nodes in order to gain a considerable degree of advantage. For example, as shown in FIG. 20, one additional sensing node may be added to each side of the target area 12, making a total of five sensing nodes and essentially four quadrants.

By comparing the relative signals from each pair of sensing nodes, an object may be located to a particular quadrant, so removing all positional ambiguities down to the resolution of a single quadrant. It is then a matter of choice as to the spatial resolution required. For example, taking the case of a human hand in a gesture recognition system, it would be appropriate to place sensing nodes at approximately 20 cm intervals, for an approximately 1 m×1 m detection area 12, in order to avoid ambiguities. This technique will enable individual objects to be tracked as long as they are in different sectors at some point in time. Software may be employed to resolve the target area into multiple objects, and may then be employed to continue tracking those objects within a single sector.

The present invention as described has numerous advantages and unique features and benefits, including especially the following features:

Target location and tracking with static excitation field using a field gradient detection technique with differential sensor nodes.

50 Hz target location and tracking, including stationary targets using electric field detection technique.

50 Hz target location and tracking, including stationary targets using field gradient detection technique with differential sensor nodes.

Use of imbalanced pairs of sensors in a sensing node to increase differential node sensitivity.

Use of any of the above techniques to detect and locate non-periodic/non-continuous signals which may arise from either natural or manmade causes, including ambient or background noise.

The invention claimed is:

1. A target object detection system, comprising:
a plurality of sensing nodes for positioning at respective detection locations with respect to a detection area that is situated within a field generated by an ambient AC source of excitation, each sensing node having at least one electric potential sensor designed to detect perturbations in said field caused by a target object, said at least one electric potential sensor including an electrode responsive to the AC excitation field for generating detection signals, an amplifier connected to the electrode for receiving and amplifying the detection signals to produce AC measurement signals as output, and at least one feedback circuit from an output of the amplifier to an input thereof for enhancing the input impedance of the amplifier; and
a signal processing arrangement associated with each sensing node and comprising a filter circuit adapted to filter out frequencies that are outside a pre-defined pass band, wherein the AC source has a frequency or a band of frequencies within the pass band, and a level detector responsive to the AC measurement signals for monitoring signal amplitude and generating amplitude information for use in producing target object data;
wherein the electric potential sensors are arranged in differential pairs for generating a differential output from the AC measurement signals from two electric potential sensors in each pair.

2. A detection system according to claim 1 in which each sensing node has a single said electric potential sensor and in which the sensing nodes are arranged in pairs with the two electric potential sensors of each pair of nodes being connected to a respective differential amplifier for generating the differential output.

3. A detection system according to claim 1 in which each sensing node comprises a pair of electric potential sensors, whose electrodes are closely spaced to respond to changes in the field gradient from the ambient AC source of excitation, the two electric potential sensors in each node being connected to an associated differential amplifier for generating the differential output.

4. A detection system according to claim 3 in which the electrodes of the two electric potential sensors in each sensing node have a baseline spacing of approximately 1 centimeter.

5. A detection system according to claim 3 in which the electrodes of the two electric potential sensors in each sensing node comprise discs of different sizes.

6. A detecting system according to claim 3 in which each sensing node includes a transmitter for wirelessly transmitting the differential output to a data collection arrangement including a receiver for receiving the differential output, said data collection arrangement including a central processing unit.

7. A detection system according to claim 1 in which the sensing nodes are positioned about a perimeter of the detection area.

8. A detection system according to claim 1 in which the detection area comprises a rectangular space surrounded by the field generated by the ambient AC source of excitation, and in which the sensing nodes are positioned at the corners of the detection area.

9. A detection system according to claim 8, comprising three sensing nodes positioned at three out of four total corners of the detection area.

10. A detection system according to claim 8 in which the detection area is partitioned into a grid to define plural rectangular grid sectors, and in which the sensing nodes are positioned such that each grid sector is monitored by at least three sensing nodes.

11. A detection system according to claim 1, further comprising a display connected to a central processing unit for displaying a position or a movement of the target object responsive to the target object data.

12. A detection system according to claim 1, further comprising:
   a memory storing a tracking algorithm for calculating a position or a movement of the target object within the detection area; and
   a central processing unit to process the amplitude information according to the stored algorithm for generating target object data by calculating the position or the movement of the target object.

13. A method for target object detection, comprising:
   positioning a plurality of sensing nodes at respective detection locations with respect to a detection area that is situated within a field generated by an ambient AC source of excitation, each sensing node having at least one electric potential sensor designed to detect perturbations in said field caused by a target object, said at least one electric potential sensor including an electrode responsive to the AC excitation field for generating detection signals, said at least one electric potential sensor further having an amplifier connected to the electrode for receiving and amplifying the detection signals to produce AC measurement signals as output, and at least one feedback circuit from an output of the amplifier to an input thereof for enhancing the input impedance of the amplifier;
   processing the AC measurement signals by filtering out frequencies that are outside a pre-defined pass band, wherein the AC source has a frequency or a band of frequencies within the pass band; and
   monitoring the signal amplitude of said processed AC measurement signals to generate amplitude information for use in producing target object data;
   wherien the electric potential sensors are arranged in differential pairs for generating a differential output from the AC measurment signals from two electric potential sensors in each pair.

14. A method for target object detection according to claim 13, further comprising:
   calculating a position or a movement of the target object from the amplitude information in order to generate target object data.

15. A target object detection system, comprising:
   a plurality of sensing nodes for positioning at respective detection locations with respect to a detection area that is situated within a field generated by an ambient AC source of excitation, each sensing node having at least one electric potential sensor designed to detect perturbations in said field caused by a target object, said at least one electric potential sensor including an electrode responsive to the AC excitation field for generating detection signals, an amplifier connected to the electrode for receiving and amplifying the detection signals to produce AC measurement signals as output, and at least one feedback circuit from an output of the amplifier to an input thereof for enhancing the input impedance of the amplifier; and
   a signal processing arrangement associated with each sensing node and comprising a filter circuit adapted to filter out frequencies that are outside a pre-defined pass band, wherein the AC source has a frequency or a band of frequencies within the pass band, and a level detector responsive to the AC measurement signals for monitoring signal amplitude and generating amplitude information for use in producing target object data;
   wherein the detection area comprises a rectangular space surrounded by the field generated by the ambient AC source of excitation, wherein the sensing nodes are positioned at the corners of the detection area, wherein detection area is partitioned into a grid to define plural rectangular grid sectors, and wherein the sensing nodes are positioned such that each grid sector is monitored by at least three sensing nodes.

16. A detection system according to claim 15, further comprising a display connected to a central processing unit for displaying a position or a movement of the target object responsive to the target object data.

17. A detection system according to claim 15, further comprising:
   a memory storing a tracking algorithm for calculating a position or a movement of the target object within the detection area; and
   a central processing unit to process the amplitude information according to the stored algorithm for generating target object data by calculating the position or the movement of the target object.

* * * * *